(12) United States Patent
Ferdi et al.

(10) Patent No.: US 12,284,700 B2
(45) Date of Patent: Apr. 22, 2025

(54) METHODS FOR PRIVACY PROTECTION USING COORDINATION OF INITIAL CONNECTION RELEASE DURING RELAY RESELECTION

(71) Applicant: InterDigital Patent Holdings, Inc., Wilmington, DE (US)

(72) Inventors: Samir Ferdi, Kirkland (CA); Michelle Perras, Montreal (CA); Ulises Olvera-Hernandez, Saint-Lazare (CA)

(73) Assignee: InterDigital Patent Holdings, Inc.v, Wilmington, DE (US)

( * ) Notice: Subject to any disclaimer, the term of this patent is extended or adjusted under 35 U.S.C. 154(b) by 0 days.

(21) Appl. No.: 18/778,509

(22) Filed: Jul. 19, 2024

(65) Prior Publication Data

US 2024/0407023 A1 Dec. 5, 2024

Related U.S. Application Data

(63) Continuation of application No. PCT/US2024/023079, filed on Apr. 4, 2024.
(Continued)

(51) Int. Cl.
*H04W 76/14* (2018.01)
*H04W 76/11* (2018.01)
(Continued)

(52) U.S. Cl.
CPC ............ *H04W 76/14* (2018.02); *H04W 76/11* (2018.02); *H04W 76/23* (2018.02); *H04W 88/04* (2013.01)

(58) Field of Classification Search
CPC ..... H04W 76/11; H04W 76/14; H04W 76/23; H04W 88/04; H04W 8/005; H04W 8/26;
(Continued)

(56) References Cited

U.S. PATENT DOCUMENTS 11,239,898 B1 * 2/2022 Chandra ............... H04W 40/22
11,638,132 B2 4/2023 Perras et al.
(Continued)

FOREIGN PATENT DOCUMENTS

CN 113011765 B 10/2022
RU 2400942 9/2010
(Continued)

OTHER PUBLICATIONS

Tenny et al., Secure Mechanism For Establishing Connection Through Multi-hop Side Link, machine English translation of CN 115567930 A, Clarivate Analytics, pp. 1-34 (Year: 2024).*
(Continued)

*Primary Examiner* — Thomas R Cairns
(74) *Attorney, Agent, or Firm* — Volpe Koenig

(57) ABSTRACT

In an implementation, a second device, for example a second WTRU, may receive a Link Modification Request (LMR) message from a first device, for example a first WTRU, via a first relay. The LMR message may include one or more new MSBs for a new Key NR ProSe identifier (KNRP ID). The second WTRU may send a link modification accept (LMA) message to the first WTRU via the first relay. The LMA message may include one or more new LSBs for the new KNRP ID. The second WTRU may form the new KNRP ID by combining the one or more new MSBs with the one or more new LSBs and replacing an existing KNRP ID with the new KNRP ID. The second WTRU may also receive a direct connection request (DCR) message from the first WTRU via a second relay. The DCR message may include the new KNRP ID.

10 Claims, 11 Drawing Sheets

Related U.S. Application Data

(60) Provisional application No. 63/457,073, filed on Apr. 4, 2023.

(51) Int. Cl.
*H04W 76/23* (2018.01)
*H04W 88/04* (2009.01)

(58) Field of Classification Search
CPC ........... H04W 12/041; H04W 12/0471; H04W 16/26; H04W 36/00; H04W 48/18; H04W 48/20; H04W 84/047; H04W 84/18; H04W 88/06; H04B 7/15; H04L 12/14; H04L 12/5691; H04L 45/24; H04L 61/00; H04L 63/18; H04L 69/14
See application file for complete search history.

(56) References Cited

U.S. PATENT DOCUMENTS

| | | | |
|---|---|---|---|
| 2006/0105709 A1* | 5/2006 | Oh | H04W 88/04 455/13.1 |
| 2007/0297367 A1 | 12/2007 | Terry et al. | |
| 2011/0238997 A1 | 9/2011 | Bellur et al. | |
| 2014/0032905 A1 | 1/2014 | Long et al. | |
| 2014/0119544 A1 | 5/2014 | Lee et al. | |
| 2014/0215135 A1 | 7/2014 | Park et al. | |
| 2017/0202038 A1 | 7/2017 | Ahmad | |
| 2017/0245245 A1 | 8/2017 | Kim et al. | |
| 2017/0289098 A1 | 10/2017 | Chun et al. | |
| 2018/0077241 A1 | 3/2018 | Byun et al. | |
| 2018/0159935 A1 | 6/2018 | Cavalcanti et al. | |
| 2018/0254820 A1* | 9/2018 | Chae | H04W 4/70 |
| 2019/0053251 A1 | 2/2019 | Loehr et al. | |
| 2019/0089547 A1 | 3/2019 | Simplicio et al. | |
| 2019/0223008 A1 | 7/2019 | Vanderveen et al. | |
| 2020/0100088 A1 | 3/2020 | Kim et al. | |
| 2020/0145798 A1 | 5/2020 | Kim et al. | |
| 2020/0178048 A1 | 6/2020 | Kim et al. | |
| 2020/0336258 A1 | 10/2020 | Zhu et al. | |
| 2021/0144781 A1* | 5/2021 | Xu | H04W 24/02 |
| 2021/0211870 A1* | 7/2021 | Perras | H04W 4/40 |
| 2022/0007445 A1 | 1/2022 | Pan et al. | |
| 2023/0007710 A1* | 1/2023 | Tenny | H04W 12/106 |
| 2023/0032220 A1 | 2/2023 | Guo et al. | |
| 2023/0224778 A1 | 7/2023 | Perras et al. | |
| 2024/0179764 A1 | 5/2024 | Pan | |

FOREIGN PATENT DOCUMENTS

| | | | | |
|---|---|---|---|---|
| WO | 2016/122533 | 8/2016 | | |
| WO | 2017/027355 | 2/2017 | | |
| WO | 2017/173072 | 10/2017 | | |
| WO | 2018/066876 | 4/2018 | | |
| WO | 2018/128505 | 7/2018 | | |
| WO | 2018/208061 | 11/2018 | | |
| WO | WO-2021201857 A1 * | 10/2021 | ........... | H04W 12/033 |
| WO | WO-2024042048 A1 * | 2/2024 | ......... | H04L 63/0464 |

OTHER PUBLICATIONS

Interdigital et al., "Update TR 33.740 conclusion for KI #2," 3GPP TSG-SA3 Meeting #111, S3-232596, Berlin, Germany (May 22-26, 2023).
Interdigital, "Identity privacy for L2 U2U Relay," 3GPP TSG-SA3 Meeting #112, S3-233581, Goteborg, Sweden (Aug. 14-18, 2023).
Interdigital, "New solution KNRP ID privacy in L2 U2U Relay reselection," 3GPP TSG-SA3 Meeting #110Ad-Hoc-e, S3-231784, Electronic meeting, online (Apr. 17-21, 2023).
Interdigital, "New Solution using Re-keying for L2 U2U Relay reselection," 3GPP TSG-SA3 Meeting #110Ad-Hoc-e, S3-231783, Electronic meeting, online (Apr. 17-21, 2023).
Interdigital, "TR 33.836 solution #4 update," 3GPP TSG-SA WG3 Meeting #96-Adhoc, S3-193307, Chongqing, CN (Oct. 14-18, 2019).
Interdigital, "Update evaluation TR 33.740 solution #14," 3GPP TSG-SA3 Meeting #109Adhoc-e, S3-230031, Online (Jan. 16-20, 2023).
Interdigital, "Update to TR 33.740 Solution #35," 3GPP TSG-SA3 Meeting #111, S3-232599, Berlin, Germany (May 22-26, 2023).
Interdigital, "Update TR 33.740 conclusion for KI #4," 3GPP TSG-SA3 Meeting #111, S3-232597, Berlin, Germany (May 22-26, 2023).
Interdigital, "Update TR 33.740 solution #14," 3GPP TSG-SA3 Meeting #109, S3-224007, Toulouse, France (Nov. 14-18, 2022).
Interdigital, "Update TR 33.740 Solution #34," 3GPP TSG-SA3 Meeting #111, S3-232598, Berlin, Germany (May 22-26, 2023).
LG Electronics, "Clarification of ID change for V2X PC5 communication," 3GPP TSG SA WG3 (Security) Meeting #87, S3-171109, Ljubljana, Slovenia (May 15-19, 2017).
Oppo et al., "Security of L2 end UE for relay reselection," 3GPP TSG-CT WG1 Meeting #144, C1-238128, Xiamen (Oct. 9-13, 2023).
Qualcomm Incorporated et al., "V2X privacy over PC5," 3GPP TSG-CT WG1 Meeting #101bis, C1-170340, Spokane (WS), USA (Jan. 16-20, 2017).
Qualcomm Incorporated, "Security establishment procedures for ProSe one-to-one communication," 3GPP TSG-CT WG1 Meeting #96, C1-161418, Jeju, Korea (Feb. 15-19, 2016).
SA WG2, "New SID: Study on architecture enhancements for 3GPP support of advanced V2X services—Phase 2," 3GPP TSG SA Meeting #85, SP-190631, Newport Beach, USA (Sep. 17-20, 2019).
Third Generation Partnership Project, "Technical Specification Group Services and System Aspects; Security aspects of 3GPP support for advanced Vehicle-to-Everything (V2X) services (Release 17)," 3GPP TS 33.536 V17.1.0 (Jun. 2022).
Third Generation Partnership Project, "Technical Specification Group Services and System Aspects; Security aspects of 3GPP support for advanced Vehicle-to-Everything (V2X) services (Release 18)," 3GPP TS 33.536 V18.0.0 (Mar. 2024).
Third Generation Partnership Project, "Technical Specification Group Services and System Aspects; Security Aspects of Proximity based Services (ProSe) in the 5G System (5GS) (Release 17)," 3GPP TS 33.503 V17.2.0 (Dec. 2022).
Third Generation Partnership Project, "Technical Specification Group Services and System Aspects; Security Aspects of Proximity based Services (ProSe) in the 5G System (5GS) (Release 17)," 3GPP TS 33.503 V17.3.0 (Mar. 2023).
Third Generation Partnership Project, "Technical Specification Group Services and System Aspects; Security Aspects of Proximity based Services (ProSe) in the 5G System (5GS) (Release 17)," 3GPP TS 33.503 V17.7.0 (Mar. 2024).
Third Generation Partnership Project, "Technical Specification Group Services and System Aspects; Security aspects of Proximity based Services (ProSe) in the 5G System (5GS) (Release 18)," 3GPP TS 33.503 V18.2.0 (Mar. 2024).
Third Generation Partnership Project, "Technical Specification Group Core Network and Terminals; Proximity-services (ProSe) in 5G System (5GS) protocol aspects; Stage 3 (Release 17)," 3GPP TS 24.554 V17.3.0 (Dec. 2022).
Third Generation Partnership Project, "Technical Specification Group Core Network and Terminals; Proximity-services (ProSe) in 5G System (5GS) protocol aspects; Stage 3 (Release 17)," 3GPP TS 24.554 V17.8.0 (Mar. 2024).
Third Generation Partnership Project, "Technical Specification Group Core Network and Terminals; Proximity-services (ProSe) in 5G System (5GS) protocol aspects; Stage 3 (Release 18)," 3GPP TS 24.554 V18.4.0 (Mar. 2024).
Third Generation Partnership Project, "Technical Specification Group Services and System Aspects; Study on security aspects of Proximity Based Services (ProSe) in 5G System (5GS) phase 2 (Release 18)," 3GPP TR 33.740 V18.1.0 (Sep. 2023).
Third Generation Partnership Project, "Technical Specification Group Services and System Aspects; Study on security aspects of Prox-

(56) References Cited

OTHER PUBLICATIONS imity Based Services (ProSe) in 5G System (5GS) phase 2 (Release 18)," 3GPP TR 33.740 V0.6.0 (Feb. 2023).

Third Generation Partnership Project, "Technical Specification Group Services and System Aspects; Proximity based Services (ProSe) in the 5G System (5GS) (Release 18)," 3GPP TS 23.304 V18.1.0 (Mar. 2023).

Third Generation Partnership Project, "Technical Specification Group Services and System Aspects; Proximity based Services (ProSe) in the 5G System (5GS) (Release 18)," 3GPP TS 23.304 V18.5.1 (Apr. 2024).

Third Generation Partnership Project, "Technical Specification Group Services and System Aspects; Proximity based Services (ProSe) in the 5G System (5GS) (Release 18)," 3GPP TS 23.304 V18.0.0 (Dec. 2022).

Third Generation Partnership Project, "Technical Specification Group Services and System Aspects; Architecture enhancements for 5G System (5GS) to support Vehicle-to-Everything (V2X) services (Release 18)," 3GPP TS 23.287 V18.0.0 (Mar. 2023).

Third Generation Partnership Project, "Technical Specification Group Services and System Aspects; Architecture enhancements for 5G System (5GS) to support Vehicle-to-Everything (V2X) services (Release 18)," 3GPP TS 23.287 V18.3.0 (Mar. 2024).

Third Generation Partnership Project, "Technical Specification Group Services and System Aspects; Proximity-based services (ProSe); Stage 2 (Release 17)," 3GPP TS 23.303 V17.0.0 (Dec. 2021).

Third Generation Partnership Project, "Technical Specification Group Services and System Aspects; Proximity-based services (ProSe); Stage 2 (Release 18)," 3GPP TS 23.303 V18.0.0 (Mar. 2024).

Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).

Third Generation Partnership Project, "Technical Specification Group Services and System Aspects; Enhancement of 3GPP support for V2X scenarios; Stage 1 (Release 17)," 3GPP TS 22.186 V17.0.0 (Mar. 2022).

Third Generation Partnership Project, "Technical Specification Group Services and System Aspects; Enhancement of 3GPP support for V2X scenarios; Stage 1 (Release 18)," 3GPP TS 22.186 V18.0.1 (Mar. 2024).

Third Generation Partnership Project, "Technical Specification Group Services and System Aspects; Study on security aspects of 3GPP support for advanced Vehicle-to-Everything (V2X) services (Release 16)," 3GPP TR 33.836 V16.1.0 (Sep. 2020).

Third Generation Partnership Project, "Technical Specification Group Services and System Aspects; Architecture enhancements for V2X services (Release 17)," 3GPP TS 23.285 V17.1.0 (Jun. 2022).

Third Generation Partnership Project, "Technical Specification Group Services and System Aspects; Architecture enhancements for V2X services (Release 18)," 3GPP TS 23.285 V18.0.0 (Mar. 2024).

Third Generation Partnership Project, "Technical Specification Group Core Network and Terminals; Vehicle-to-Everything (V2X) services in 5G System (5GS); Stage 3 (Release 18)," 3GPP TS 24.587 V18.5.0 (Mar. 2024).

Third Generation Partnership Project, "Technical Specification Group Core Network and Terminals; Vehicle-to-Everything (V2X) services in 5G System (5GS); Stage 3 (Release 18)," 3GPP TS 24.587 V18.1.0 (Mar. 2023).

Third Generation Partnership Project, "Technical Specification Group Core Network and Terminals; Proximity-services (ProSe) User Equipment (UE) to ProSe function protocol aspects; Stage 3 (Release 18)," 3GPP TS 24.334 V18.0.0 (Dec. 2023).

Third Generation Partnership Project, "Technical Specification Group Core Network and Terminals; Proximity-services (ProSe) User Equipment (UE) to ProSe function protocol aspects; Stage 3 (Release 17)," 3GPP TS 24.334 V17.2.0 (Jun. 2021).

Third Generation Partnership Project, "Technical Specification Group Services and System Aspects; Procedures for the 5G System (5GS); Stage 2 (Release 18)," 3GPP TS 23.502 V18.0.0 (Dec. 2022).

Third Generation Partnership Project, "Technical Specification Group Services and System Aspects; Procedures for the 5G System (5GS); Stage 2 (Release 18)," 3GPP TS 23.502 V18.5.0 (Mar. 2022).

* cited by examiner

METHODS FOR PRIVACY PROTECTION USING COORDINATION OF INITIAL CONNECTION RELEASE DURING RELAY RESELECTION

CROSS-REFERENCE TO RELATED APPLICATIONS

This application is a continuation of International Patent Application PCT/US24/23079, filed on Apr. 4, 2024, which claims priority to U.S. Provisional Application No. 63/457,073, filed Apr. 4, 2023, both of which are herein incorporated by reference in their entirety.

BACKGROUND

In wireless communication systems, various standards provide relay reselection procedures. In some cases, the connection between an end WTRU via an original WTRU relay may not be released prior to the setup of a new connection via a new relay WTRU. This may be due to the fact that release of initial link with original relay reselection depends on whether a unicast link is still required and the WTRU implementation and due to the make before break (MBB) principle underlying Relay reselection procedure. For example, In the case where the end WTRU needs to prematurely release the initial connection, the end WTRU does perform a link release procedure for the original connection via the first WTRU relay before reconnecting via the new WTRU relay connection. Thus, the need exists for a technological solution to ensure proper timing for the link release of initial connection prior to the initiation of the new connection setup while ensuring the security of the link between the relay WTRU and the end WTRU.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method may include receiving a Link Modification Request (LMR) message from a first WTRU via a first relay, where the LMR message includes one or more new most significant bytes (MSBs) for a new Key NR ProSe identifier (KNRP ID), sending a link modification accept (LMA) message to the first WTRU via the first relay, where the LMA message includes one or more new least significant bytes (LSBs) for the new KNRP ID, forming the new KNRP ID by combining the one or more new MSBs with the one or more new LSBs and replacing an existing KNRP ID with the new KNRP ID, and receiving a direct connection request (DCR) message to the second WTRU via a second relay, where the DCR message includes the new KNRP ID. In an additional or alternative aspect, the method may include receiving a message from the first WTRU via the first relay over a first connection, prior to receiving the LMR message, wherein the first connection is established based on the existing KNRP ID, and wherein the existing KNRP ID is different than the new KNRP ID. In another aspect the existing KNRP ID is the same at the first WTRU and the second WTRU. The existing KNRP ID may be discarded once the new KNRP ID is formed. In yet another additional or alternative aspect, the method may included determining to maintain an initial connection of the first relay based on a configuration parameter that controls usage of simultaneous connections, wherein the configuration parameter includes a maximum number of simultaneous connections allowed for a ProSe service. Other embodiments of these aspects include corresponding computer systems, apparatus, and computer programs recorded on one or more computer storage devices, each configured to perform the actions of the methods.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
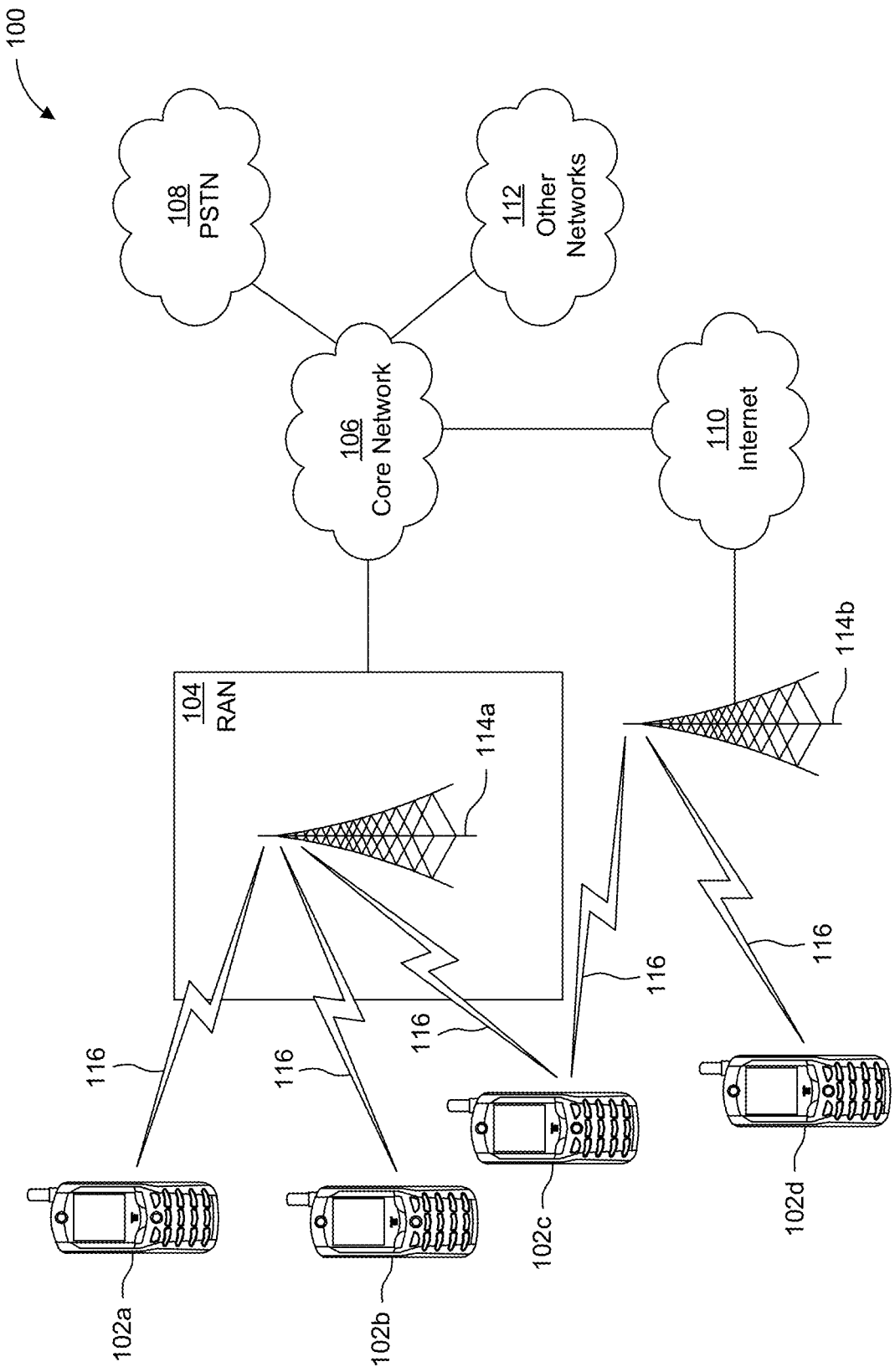
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
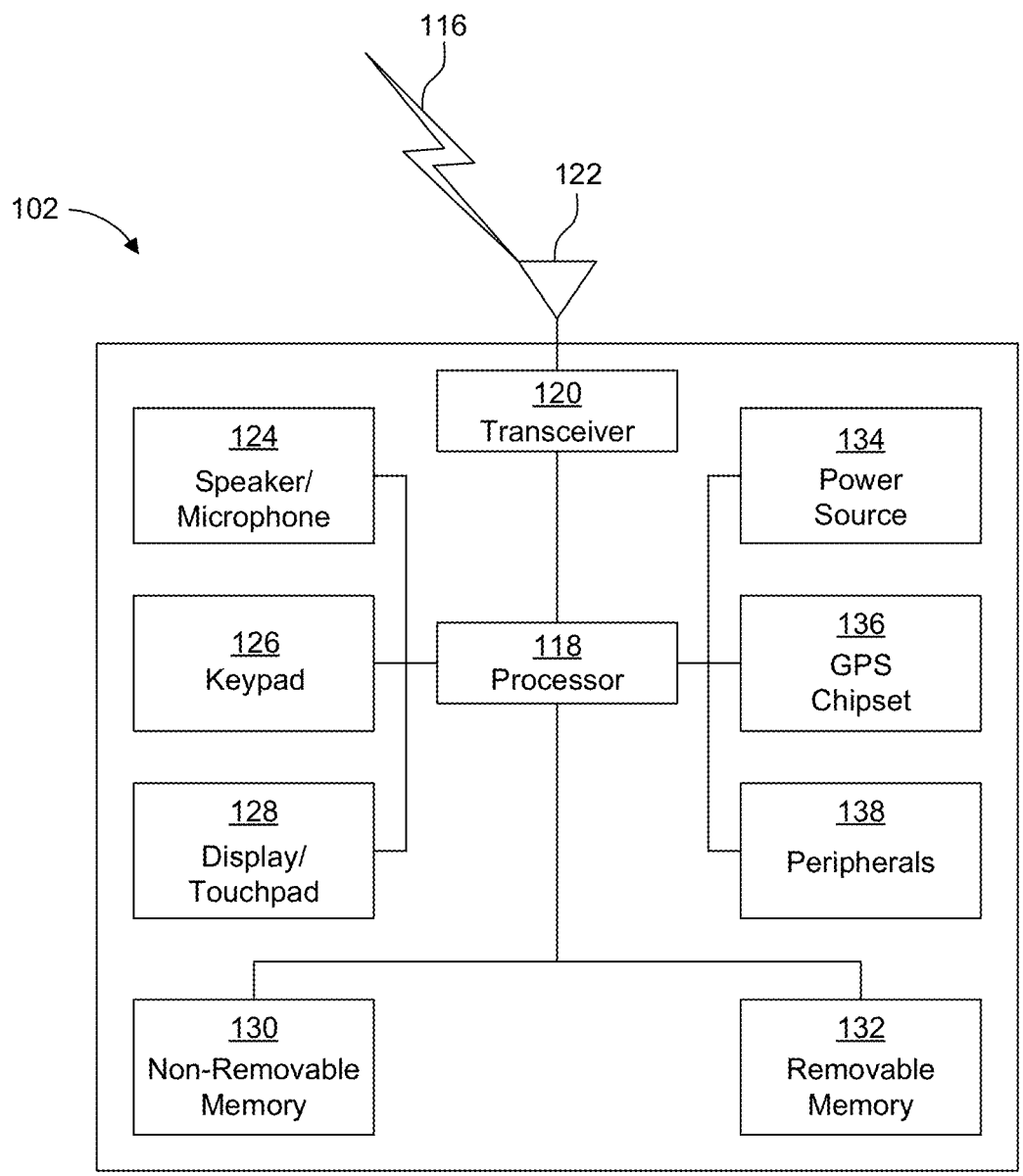
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
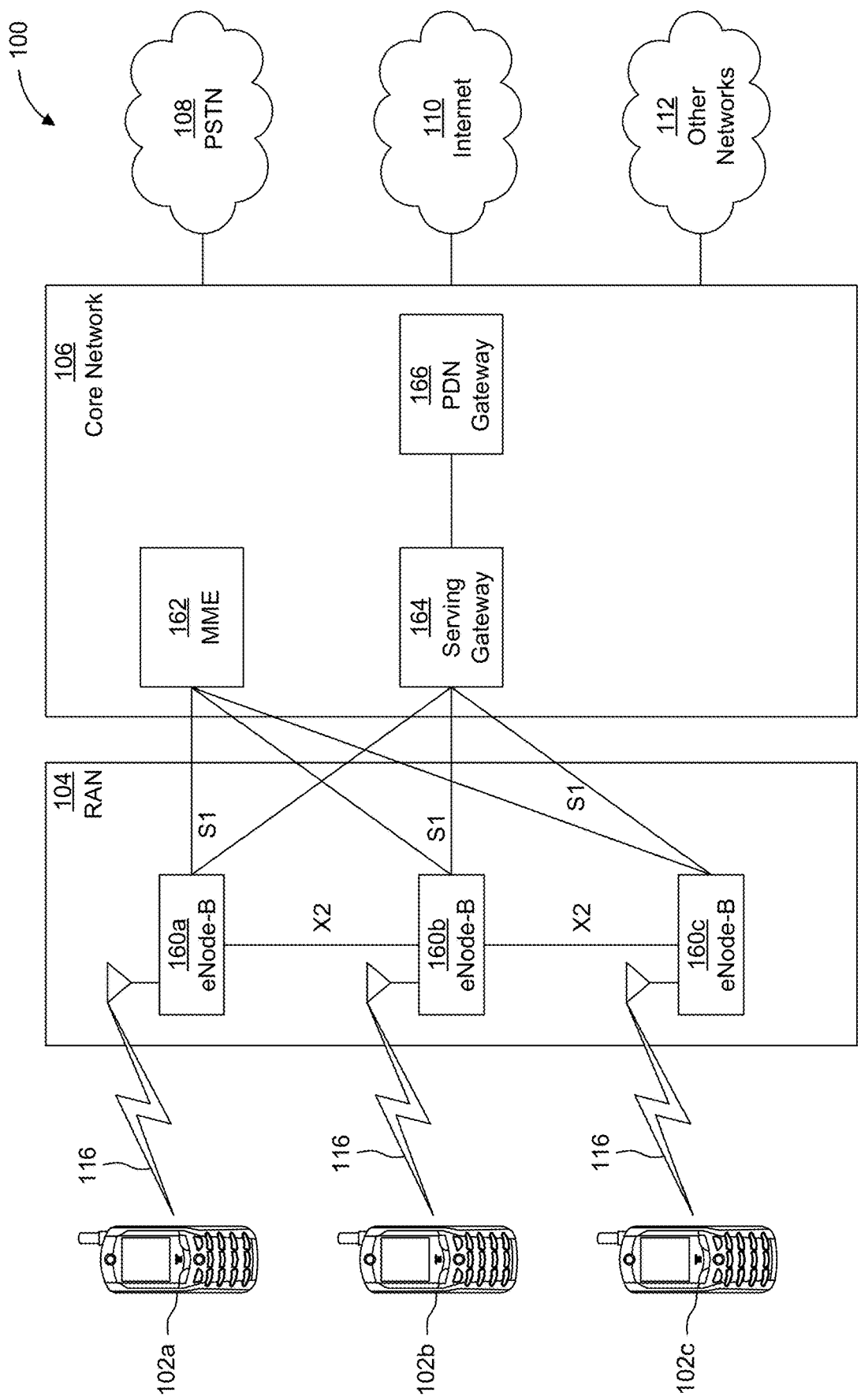
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
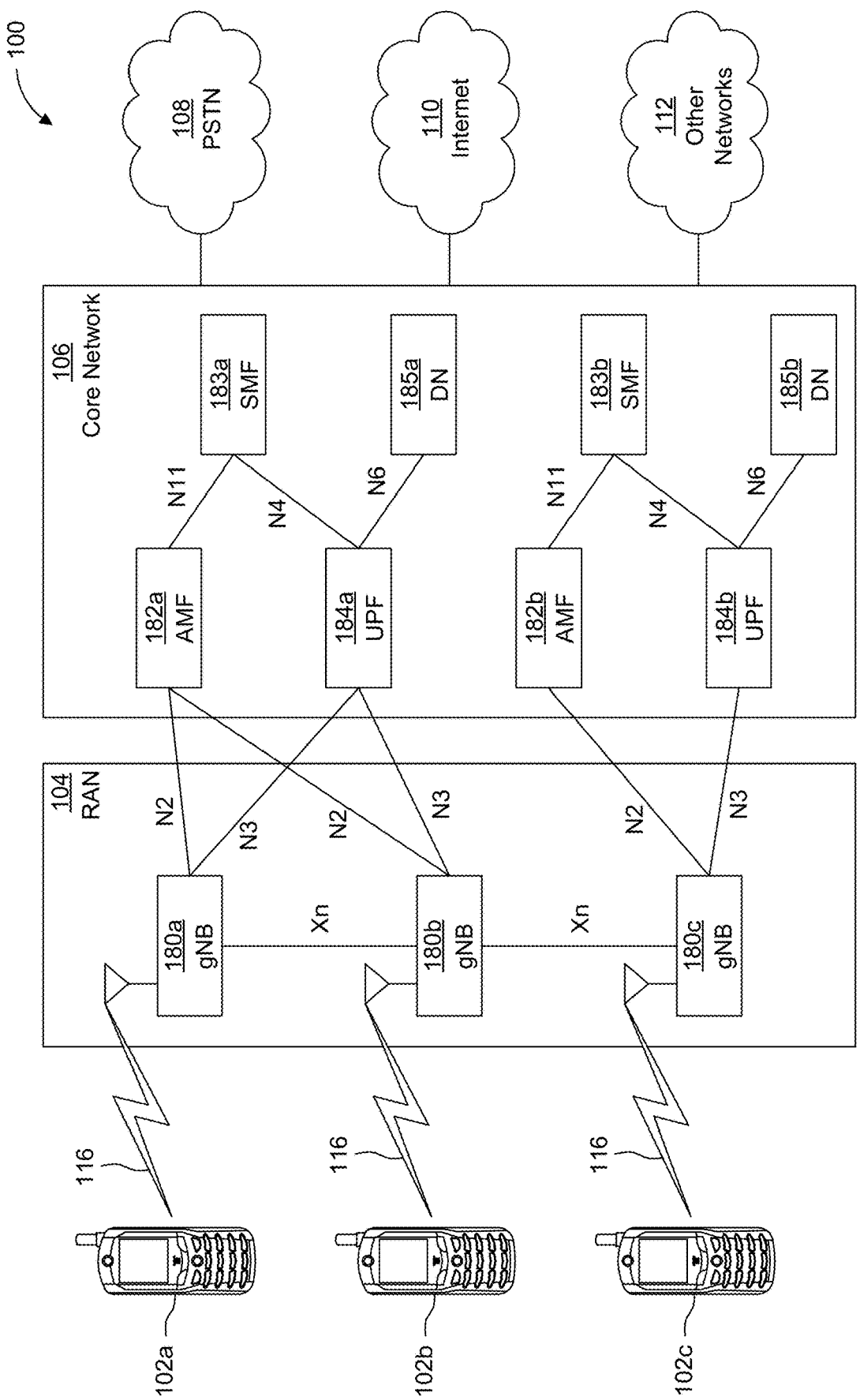
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As described herein, the following acronyms may be used: Break Before Make (BBM); Make Before Break (MBB); Direct Connection Request/Accept (DCR/DCA); (Root) Key NR ProSe (KNRP); Session Key NR PRoSe (KNRP-Sess); Link Modification Request/Accept (LMR/LMA); Least/Most Significant Byte (LSB/MSB); NR ProSe Encryption Key (NRPEK); NR ProSe Integrity Key (NRPIK); Relay Service Code (RSC); and/or, UE-to-UE Relay (U2U Relay).

Generally, a relay may be any device, such as a WTRU, a UE, a base station, a virtualized device existing on another piece of hardware, or the like; further, as described herein, reference to an "end" WTRU may indicate that the WTRU is at one end (e.g., a first or second in a simple relay scenario) of a communication link enabled by at least one relay device (e.g., a relay WTRU). A L2 U2U Relay re/selection procedure may include two end WTRUs communicating via a first relay, which then negotiate the selection of a second relay over the first relay (e.g., during a link modification procedure), prior to reconnecting via the second relay. An end WTRU may determine to trigger a relay reselection, for example, to seek a better relay (e.g., offering better signal quality/performance).

Figure 2:
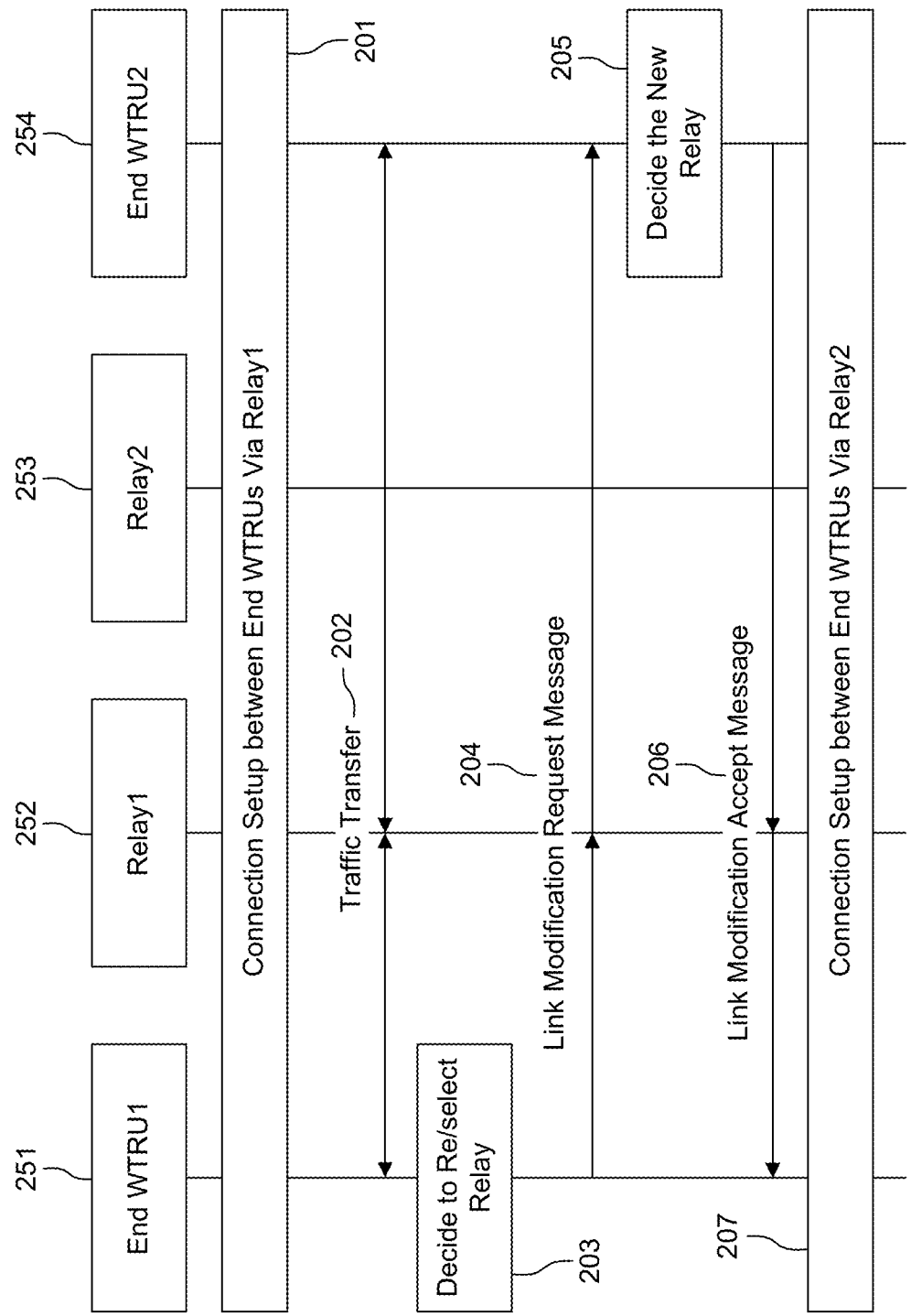
FIG. 2 illustrates an example of ProSe Layer-2 WTRU-to-WTRU (UE-to-UE) Relay reselection.

FIG. 2 illustrates an example 5G ProSe layer-2 (L2) WTRU-to-WTRU (U2U) (e.g., UE-to-UE) relay reselection.

As illustrated in the example of FIG. 2, in a reselection procedure, there may be a number of devices involved, such as an End WTRU1 251 which, for example a 5G ProSe capable device, a Relay1 252, a Relay2 253, and/or an End WTRU2 254. At 201, there may be an existing connection setup between the End WTRU1 251 and the End WTRU2 254 via Relay1 252. At 202, the End WTRUs (251 and/or 254) may communicate via Relay1 and may transfer data. At 203, at least one of the End WTRU, for example End WTRU1 251, may determine to reselect a relay. Then, End WTRUs (251 and 254) may negotiate the selection of another relay, for example Relay 2 via Relay1. At 204 End WTRU1 may send a link modification request message via Relay1 to End WTRU2. At 205, End WTRU2 may receive an indicated preference, assist, and/or determine on its own a relay WTRU to switch to, for example Relay 2. At 206, End WTRU2 may send a link modification accept message to the End WTRU2 via Relay1. The link modification procedure illustrated in 204-206 may be performed prior to reconnecting End WTRUs (251 and 254) via new Relay2 at 207.

In some cases, there may be one or more security approaches related/associated with a L2 U2U relay re/selection procedure. In such a case, there may be new security keys established as part of a Link Modification procedure as illustrated in FIG. 2. The new keys may be used to secure the connection between the End WTRU via the second Relay.

A Key NR ProSe (KNRP) ID is a unique identifier of the root key KNRP shared between two WTRUs engaged in direct communication. The KNRP and its accompanying KNRP ID values are not deleted after unicast link release. To prevent the privacy threat of an eavesdropper linking two subsequent connections using the same KNRP ID between two WTRUs engaged in direct communications, a change of KNRP ID may be performed during the Link Release procedure. The change of KNRP ID may be performed unconditionally between the two WTRUs as part of the Link Release procedure before the End WTRU reconnect again.

A re-keying procedure may be used for an ongoing connection to ensure that fresh session keys KNRP-SESS and security keys NR ProSe Encryption Key (NRPEK) and NR ProSe Integrity Key (NRPIK) are used. The procedure may also optionally be used to refresh the KNRP.

The connection between End WTRUs via original L2 U2U Relay may not be released prior to the setup of the new connection via the new L2 U2U Relay. This stems from the fact that the release of the initial link with the original relay reselection depends on whether the PC5 unicast link is still required, the WTRU implementation, and because of the make before break (MBB) principle underlying a Relay reselection procedure. The MBB principle dictates that the current connection between End WTRUs via original L2 U2U Relay should be maintained to allow for a seamless transition of communication over the new connection via the new L2 U2U Relay.

In general, the End WTRUs may be assumed to maintain the initial connection via the first U2U relay while establishing the new connection via the second U2U relay in a MBB fashion. This may be needed to minimize any potential disruption to ongoing communications during the U2U reselection procedure. The initial connection being maintained means that the mechanism using Link Release as described herein cannot be applied in the MBB scenario.

In the case where the End WTRUs needs to release the initial connection prematurely, for example due to resource constraints, the End WTRUs may not perform a Link Release procedure for the original connection via the first L2 U2U Relay before reconnecting via the new L2 U2U Relay, and/or the End WTRUs may reuse the same KNRP ID over the new End-to-End (E2E) connection. Technological solutions are provided to address how to ensure proper timing for the Link Release of an initial connection prior to the initiation of the new connection setup that is not specified in a potential break before make (BBM) scenario.

In both cases, that is MBB and BBM scenarios, an eavesdropper may be able to track the End WTRUs reusing the same KNRP ID. Technological solutions are provided to address the issues that may arise, as described herein, such as how to ensure KNRP ID privacy protection during L2 U2U Reselection.

The preparation of new security keys using the connection via the first relay during a Link Modification procedure, as described herein, provides a benefit of an early security establishment for a faster link setup via the new relay and also the availability of security keys of securing initial message, for example Direct Connection Request (DCR).

Improving upon existing security procedures and/or reducing security related logic in the Link Modification procedure may be desirable to reduce impact to existing implementations.

The establishment of new keys may also depend on the provisioned security policy, which needs to be considered for the preparation of the new security keys. Technological solutions provided address how to establish new security keys, for example for a new connection via a second Relay, during the relay reselection procedure, while considering provisioned security policy and potential impact to existing procedures.

In one or more examples described herein, for KNRP ID privacy there may be a L2 U2U reselection procedure where a first End WTRU (End WTRU1) establishes a new KNRP ID with a second End WTRU (End WTRU2) using a Link Modification procedure or coordinated Link Release of an initial connection via a first Relay (Relay1). End WTRU1 establishes a new connection with End WTRU2 via a second Relay (Relay2) using the new KNRP ID. This approach enables the privacy protection of the KNRP ID while the End WTRUs establish the new connection via the Relay2, thus mitigating the risk of a link between the new KNRP ID with old KNRP ID by an attacker. In other words, this enables the privacy of the new key ID, and ensures it is protected during a link procedure. The approaches described herein propose to leverage and enhance the Link Modification procedure, which is mandatory for L2 U2U reselection, to negotiate the maintenance (MBB) or release (BBM) of the initial connection prior to the setup of the new connection. The End WTRUs establish a new KNRP ID as part of the LinkModification procedure if MBB is selected. The End WTRUs coordinate a Link Release procedure for the initial connection to establish a new KNRP ID prior to initiation of new connection setup if BBM is selected. In this way, one issue that may be avoided is where an attacker may try to link an old key ID with a new key ID in order to track the WTRU.

In one or more examples described herein (e.g., for communication security), there may be a L2 U2U reselection security procedure wherein a first End WTRU (End WTRU1) negotiates with a second WTRU (End WTRU2) using a Link Modification procedure via a first Relay (Relay1), and/or the performing of an enhanced re-keying procedure. The End WTRU1 performs an enhanced re-keying procedure with End WTRU2 to establish a fresh correlation ID and generate new keys to be used to secure a new connection via a second relay (Relay2). This approach enables the preparation of security keys to protect the new connection setup, including an initial message, for example DCR while improving upon a re-keying procedure.

Figure 3:
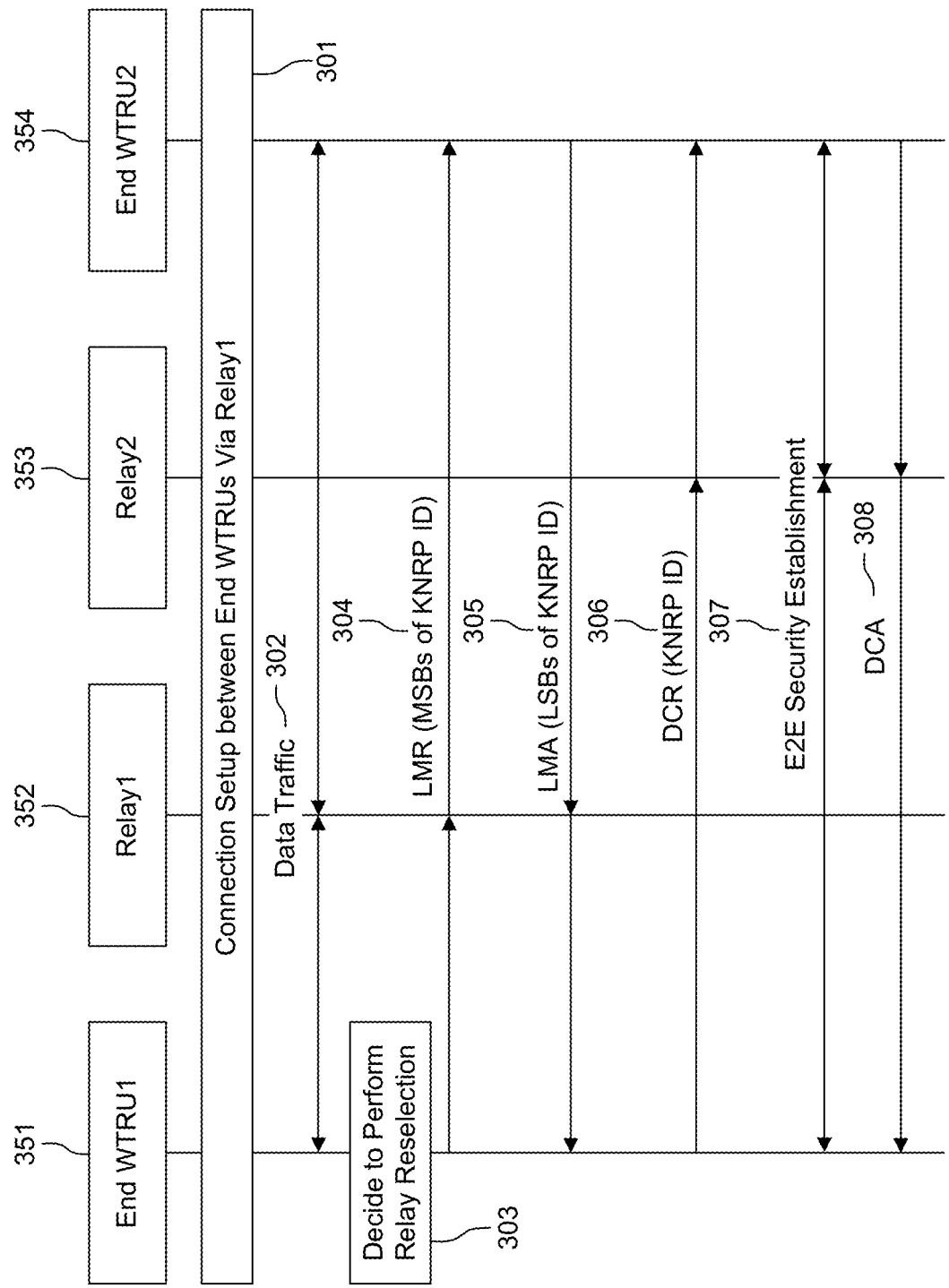
FIG. 3 illustrates an example of ProSe WTRU-to-WTRU Relay reselection with new KNRP ID established using LMR/LMA.

FIG. 3 illustrates an example of ProSe U2U Relay reselection with privacy protection of KNRP ID. As illustrated, there may be a number of devices involved in a reselection procedure, such as End WTRU1 351, a Relay1 352, Relay2 353, and/or End WTRU2 354. While FIG. 3 illustrates an ordered series of actions/events, it is intended that one or more of these actions/events may be optional, and/or one or more of these actions/events may occur/be performed in a different order than presented.

At 301, a connection for unicast communication between the End WTRUs may be established via Relay1. End WTRU 2 may send a protected Direct Security Mode (DSM) Command to End WTRU2 including security parameters such as part of session key identifier, nonce, and security algo/policy. End WTRU 1 may send as a response a protected Direct Security Mode (DSM) Complete to End WTRU2 including security parameters, for example other part of session key identifier, security policy, etc.

At 302, there may be one or more messages sent/received between the End WTRUs via the Relay1. That is, WTRU1 and WTRU2 exchange data through Relay1.

At 303, the End WTRU1 may decide to perform U2U Relay reselection with End WTRU2 based on one more conditions described herein, such as resource usage condition, configuration limiting simultaneous connection for the same service, and/or others described herein. End WTRU1 decides to generate a new KNRP ID with End WTRU2 based on a decision to maintain the current connection via Relay1. For example, End WTRU1 may determine to maintain the initial connection based on the availability of resources for the new connection. In another example, End WTRU1 may decide to maintain the initial connection based on a configuration parameter that controls usage of simultaneous connections, for example a max number of simultaneous connections allowed for a ProSe service or RSC. Said another way, regarding the decision to maintain the connection, the end WTRU1 may decide to generate a new key ID after a decision to perform reselection and given that current connection is maintained.

At 304, End WTRU1 may send to End WTRU2 a Link Modification Request (LMR) message that may include an indication for the maintenance of the initial connection prior to setup of connection via Relay2, an allocated one or more new MSBs of KNRP ID and/or other parameters such as reselection indication, identifiers of Relay candidates including Relay2. The allocated one or more new MSBs of a KNRP ID, associated with End WTRU2, uniquely identifies the KNRP in End WTRU1. End WTRU1 may include other parameters to indicate whether/when to release the initial connection, for example release timer, keep connection, release upon data communication on new connection, after the new connection setup. Said another way, the allocated one or more new MSBs are for creating a new KNRP ID from the current key; once one or more new LSBs are received from the End WTRU2 later in this process, End WTRU1 may create the new KNRP ID by combining the one or more new MSBs and the one or more new LSBs, as further described herein.

At 305, the End WTRU2 may select Relay2 from the list of Relay candidates (not shown). End WTRU2 may allocate an LSB of KNRP ID, associated with End WTRU1, that uniquely identifies KNRP in End WTRU2. End WTRU2 may then combine the one or more new MSBs of KNRP ID received from End WTRU1 and the one or more new LSBs of KNRP ID to form a new KNRP ID to be used when reconnecting with End WTRU1. End WTRU2 replaces the old KNRP ID with the new KNRP ID. End WTRU2 may send to End WTRU1 a Link Modification Accept (LMA) message that includes the one or more new LSBs of KNRP ID and/or other parameters such as an identifier of selected Relay2. If the LMR does not include any release/maintain indication, the maintenance of the initial connection may be assumed by default or left to End WTRU to select (e.g., see example illustrated in FIG. 4). End WTRU2 may allocate the one or more new LSBs of KNRP ID based on the initial connection maintenance indication and/or receiving one or more new MSBs of KNRP ID.

At 306, the End WTRU1 may combine the one or more new MSBs of KNRP ID sent at 304, and the one or more new LSBs of KNRP ID received from End WTRU2 to form a new KNRP ID to be used when reconnecting with End WTRU2. End WTRU1 may replace the old KNRP ID with the new KNRP ID. End WTRU1 may send to End WTRU2 via Relay2 a DCR message including the new KNRP ID. In an example, a direct PC5 link with Relay2 may be setup or modified before sending the DCR message.

At 307, the End WTRU1 and End WTRU2 may establish the security for the connection between End WTRUs via Relay2. The KNRP ID is used to locate the corresponding KNRP used to derive the session and security keys to secure the connection. Said another way, the KNRP does not change, but the KNRP ID does change (e.g., hence the need for one or more new MSBs and LSBs).

At 308, the End WTRU1 may receive from End WTRU2 a DCA completing the connection establishment. The End WTRU (e.g., End WTRU1 or End WTRU2) determines to continue maintaining or perform the release the initial connection via Relay1 based on parameters described above such as timer, data packets exchanged on new connection.

Figure 4:
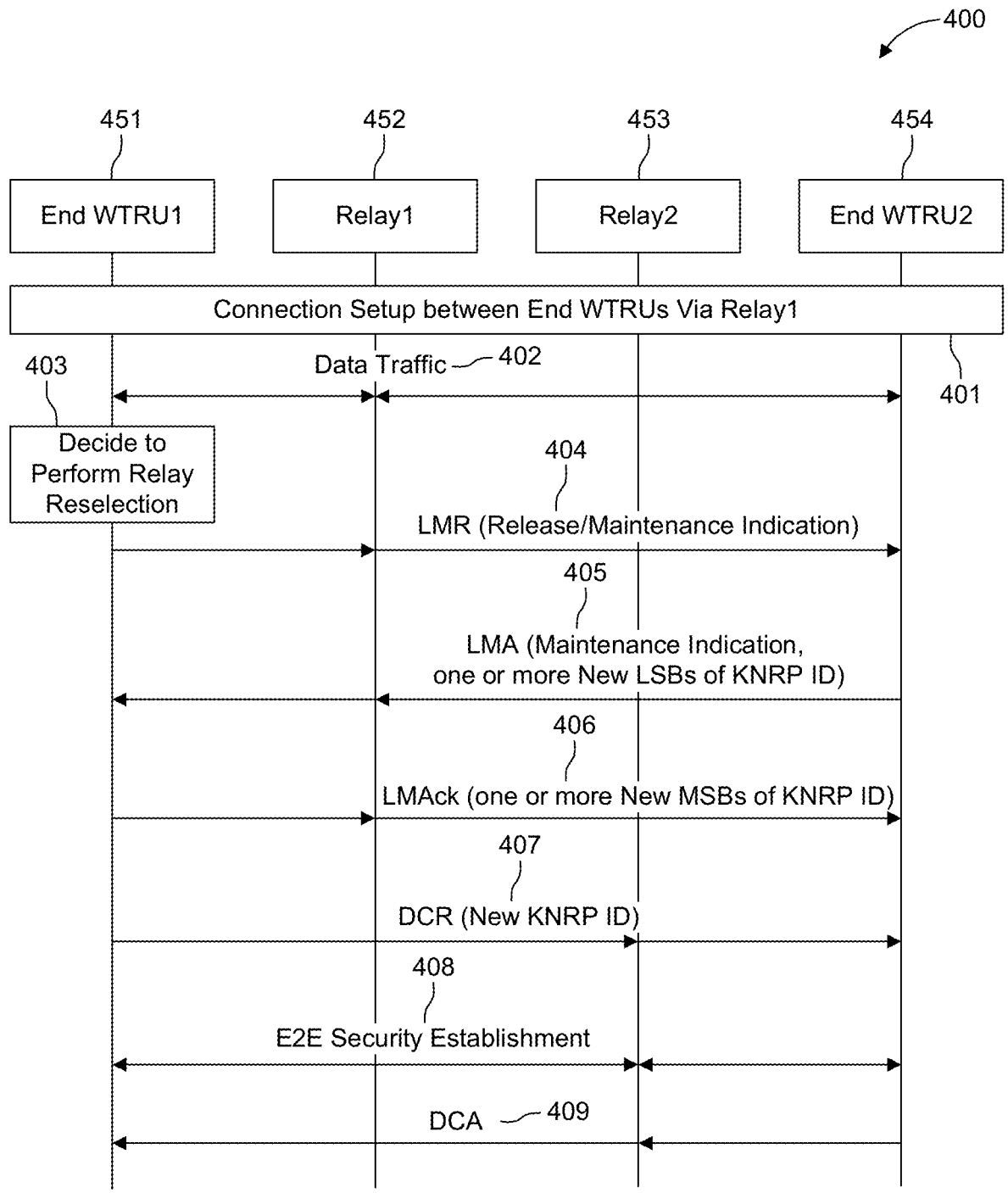
FIG. 4 illustrates an examples of ProSe WTRU-to-WTRU Relay reselection with new KNRP ID using LMR/LMA/LMAck.

FIG. 4 illustrates an example of ProSe U2U Relay reselection with privacy protection of KNRP ID based on a negotiation of initial PC5 connection release or maintenance prior to the PC5 connection setup via the selected Relay. As illustrated, there may be a number of devices involved in a reselection procedure, such as End WTRU1 451, a Relay1 452, Relay2 453, and/or End WTRU2 454. While FIG. 4 presents an ordered series of actions/events, it is intended that one or more of these actions/events may be optional, and/or one or more of these actions/events may occur/be performed in a different order than presented.

At 401, a connection for unicast communication between the End WTRUs is established via Relay1.

At 402, there may be one or more messages sent/received between the End WTRUs via the Relay1. That is, data is exchanged between the End WTRU's via Relay 1.

At 403, End WTRU1 decides to perform U2U Relay reselection with End WTRU2.

At 404, End WTRU1 sends to End WTRU2 a Link Modification Request (LMR) message, which may include a release indication or a maintenance preference indication and/or other parameters, for example reselection indication, identifiers of Relay candidates including Relay2. In some instances, the release indication is used to request the release of an initial PC5 connection prior to the setup of the connection via the selected Relay. In some instances, the maintenance indication is used to request the maintenance of the initial PC5 connection during the setup of the connection via the selected Relay.

At 405, the End WTRU2 selects Relay2 from a list of Relay candidates (not shown). End WTRU2 decides to maintain the initial connection, for example based on End WTRU1 maintenance preference, ProSe/RSC service configuration, and/or End WTRU2 resource usage, and allocates one or more new LSBs of KNRP ID, associated with End WTRU1. End WTRU2 sends to End WTRU1 a Link Modification Accept (LMA) message which includes the maintenance indication and the one or more new LSBs of KNRP ID and other parameters such as an identifier of selected Relay2. End WTRU2 may include parameters how to handle the maintained initial connection once the new connection is setup as described herein. The parameters may correspond with release based on timer, etc.

At 406, the End WTRU1 accepts the maintenance of the initial PC5 connection. End WTRU1 allocates one or more new MSBs of KNRP ID and combines the one or more new MSBs and the one or more new LSBs of KNRP ID to form a new KNRP ID to be used when reconnecting with End WTRU2. End WTRU1 replaces the old KNRP ID with the new KNRP ID. End WTRU1 sends to End WTRU2 a Link Modification Ack message, which includes the one or more new MSBs of KNRP ID. End WTRU2 combines the one or more new MSBs and the one or more new LSBs of KNRP ID to form the new KNRP ID, which is used when reconnecting with End WTRU1. End WTRU2 replaces the old KNRP ID with the new KNRP ID.

At 407, the End WTRU1 sends to End WTRU2 via Relay2 a DCR message including the new KNRP ID.

At 408, the End WTRU1 and End WTRU2 establish the security for the connection between the End WTRUs via Relay2. The new KNRP ID is used to locate the corresponding KRNP used to derive the session and security keys to secure the connection.

At 409, the End WTRU1 receives from End WTRU2 a DCA completing the connection establishment. The initial connection is maintained or released based on one or more of the parameters discussed herein (at 405 or elsewhere).

Figure 5:
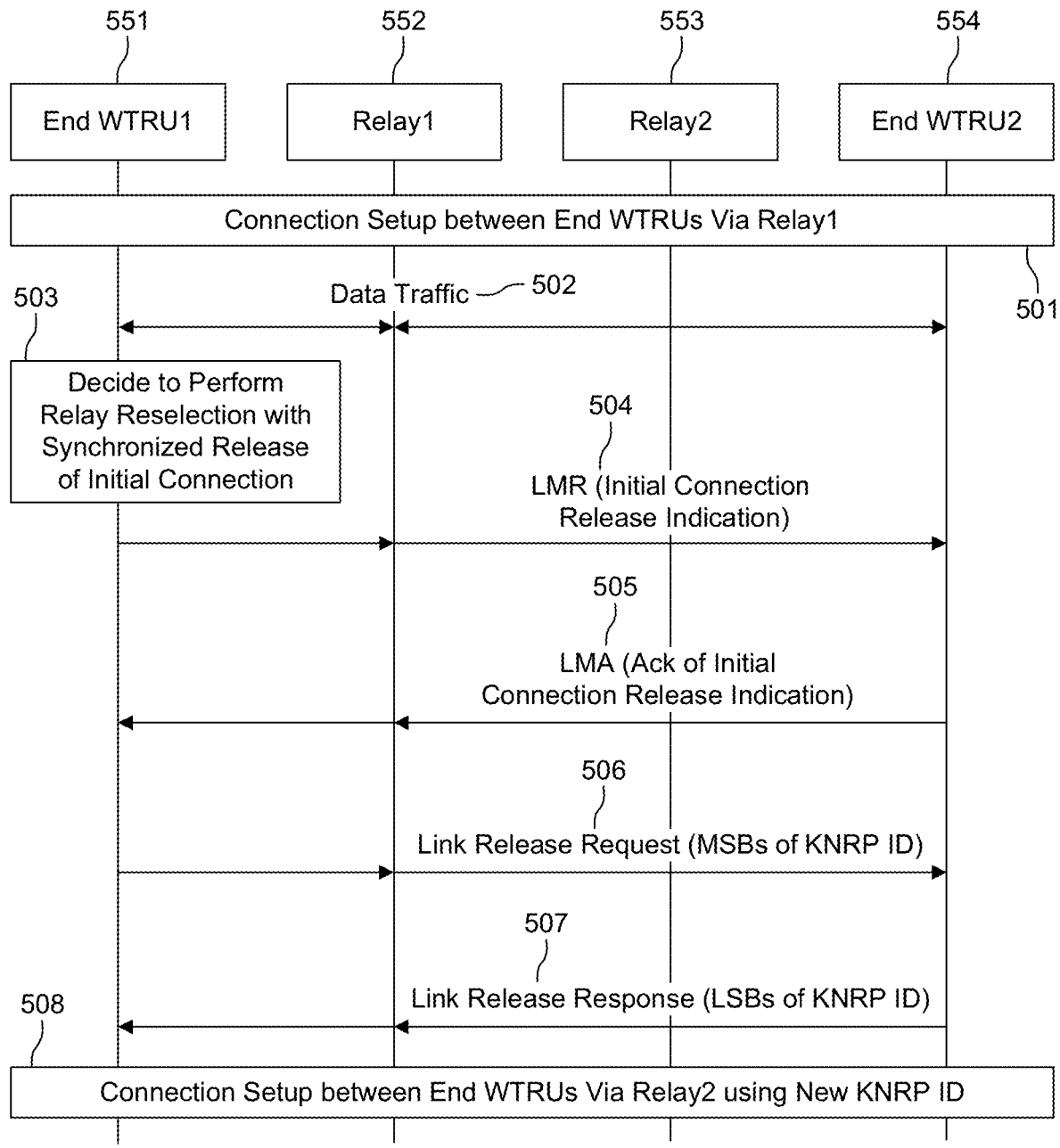
FIG. 5 illustrates an example of ProSe WTRU-to-WTRU Relay reselection with coordinated initial connection release for new KNRP ID establishment.

FIG. 5 illustrates an example of ProSe U2U Relay reselection with privacy protection of KNRP ID. As shown, there may be a number of devices involved in a reselection procedure, such as End WTRU1 551, a Relay1 552, Relay2 553, and/or End WTRU2 554. While FIG. 5 presents an ordered series of actions/events, it is intended that one or more of these actions/events may be optional, and/or one or more of these actions/events may occur/be performed in a different order than presented.

At 501, a connection for unicast communication between the End WTRUs is established via Relay1.

At 502, there may be one or more messages sent/received between the End WTRUs via the Relay1. That is, data is exchanged between End WTRUs via Relay 1

At 503, the End WTRU1 decides to perform U2U Relay reselection with End WTRU2 with coordinated release of the initial connection prior to new connection setup. For example, End WTRU1 may determine to free up resources used up by the initial connection. In another example, WTRU1 may determine to release the initial connection based on a configuration parameter that controls usage of simultaneous connections, for example a max number of simultaneous connections allowed for a ProSe service or RSC.

At 504, the End WTRU1 sends to End WTRU2 a Link Modification Request (LMR) message which includes an indication to request a coordinated release of the initial connection via Relay1 and/or other parameters that may include reselection indication and/or identifiers of Relay candidates including Relay2. Based on the release indication, End WTRU2 stops transmitting data packets and other link maintenance messages, for example Keep Alive and Link Identifier update, using the initial connection and starts a timer for the expected reception of the Link Release request from End WTRU1.

At 505, End WTRU2 sends to End WTRU1 a Link Modification Accept (LMA) message which includes an acceptance of the coordinated release of the initial connection via Relay1 and may include other parameters such as an identifier of selected Relay2. End WTRU1 stops transmitting data packets and/or other link maintenance messages, such as Keep Alive and/or Link Identifier update, as appropriate. If the End WTRU2 is expected to initiate the Link Release, End WTRU1 starts a timer for the expected reception of the Link Release request from End WTRU2.

At 506, End WTRU1 sends to End WTRU2 a Link Release Request message which includes one or more new MSBs of KNRP ID. Alternatively, End WTRU2 may send a Link Release request message instead of End WTRU1 after receiving the LMA.

At 507, End WTRU2 sends to End WTRU1 a Link Release Response message which includes a one or more new LSBs of KNRP ID. End WTRU2 establishes a new KNRP ID combining the received one or more new MSBs with the one or more new LSBs of KNRP ID.

Figure 6:
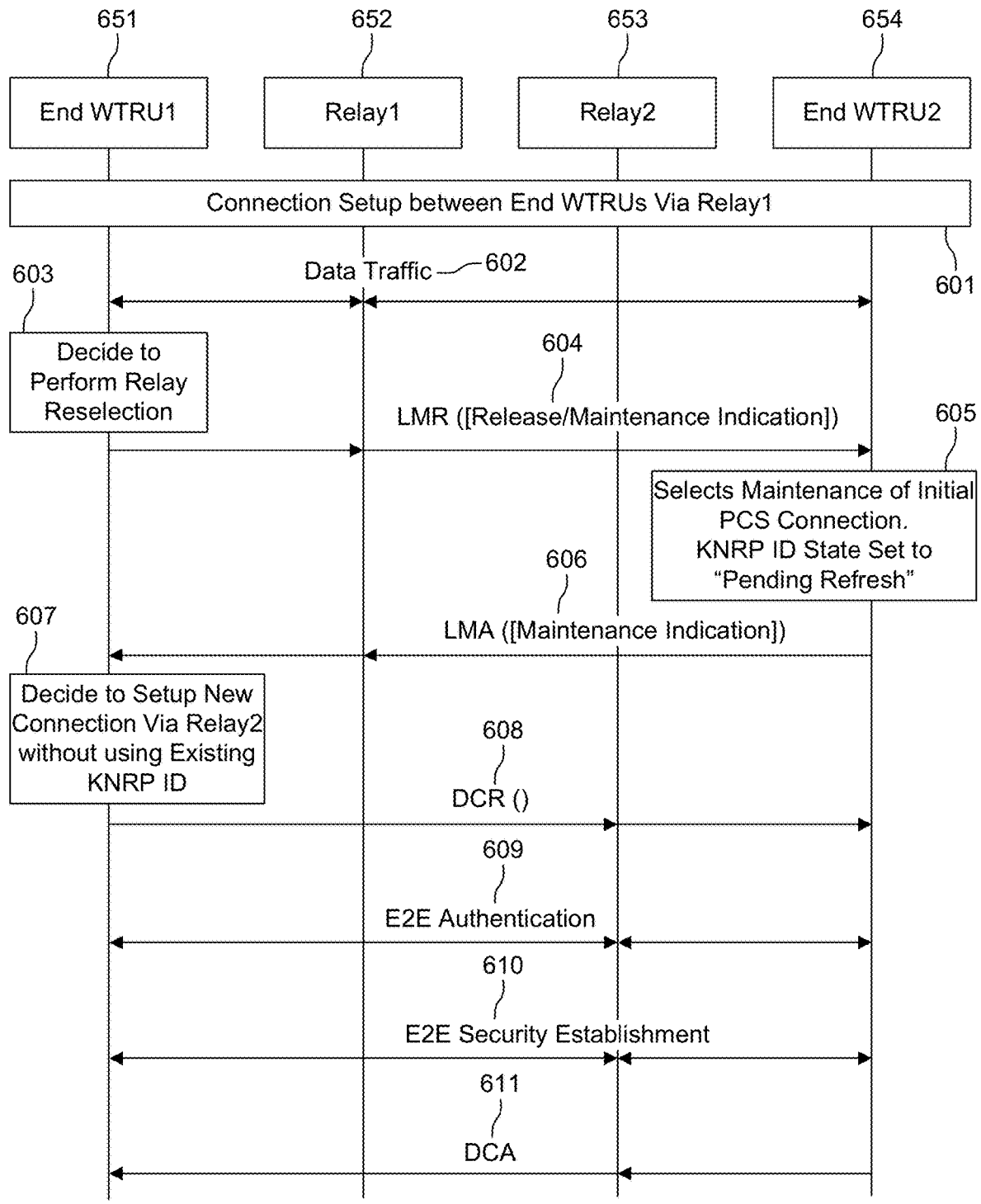
FIG. 6 illustrates an example of ProSe WTRU-to-WTRU Relay reselection with KNRP ID state set to "pending refresh"

FIG. 6 illustrates an example of ProSe U2U Relay reselection with privacy protection of KNRP ID based on a new state associated to the KNRP ID. As shown, there may be a number of devices involved in a reselection procedure, such as End WTRU1 651, a Relay1 652, Relay2 653, and/or End WTRU2 654. While FIG. 6 presents an ordered series of actions/events, it is intended that one or more of these actions/events may be optional, and/or one or more of these actions/events may occur/be performed in a different order than presented.

At 601, a connection for unicast communication between the End WTRUs is established via Relay1.

At 602, there may be one or more messages sent/received between the End WTRUs via the Relay1.

At 603, End WTRU1 decides to perform U2U Relay reselection with End WTRU2.

At 604, End WTRU1 sends End WTRU2 a Link Modification Request (LMR) message, which may include a release indication or a maintenance preference indication and/or other parameters such as reselection indication, and/or identifiers of Relay candidates including Relay2. In some cases, the release indication is used to request the release of the initial PC5 connection prior to the setup of the connection via the selected Relay. In some cases, the maintenance indication is used to request the maintenance of the initial PC5 connection during/after setup of the connection via the selected Relay.

At 605, End WTRU2 selects Relay2 from the list of Relay candidates. End WTRU2 decides to maintain the initial PC5 connection after the setup of the connection via the selected Relay is completed. End WTRU2 associates a state to the KNRP ID associated to the pair of End WTRU1/End WTRU2 and sets it to "pending refresh". In some cases, "pending refresh" state means the KNRP ID cannot be re-used during new PC5 link establishment, for example on a DCR message, and a new KNRP ID needs to be generated.

At 606, End WTRU2 sends to End WTRU1 a Link Modification Accept (LMA) message, which may include a maintenance indication and/or other parameters such as an identifier of selected Relay2. In some cases, the selection of maintenance has precedence over release, such as break before make. For example, if one of the End WTRUs prefers to maintain the PC5 connection while the other one prefers to release it, the PC5 connection is maintained. In some instances, by default, for example if no indication is specified with the LMR, maintenance is assumed.

At 607, End WTRU1 sets the KNRP ID state to "pending refresh" based on the received maintenance indication. End WTRU1 determines to setup a new PC5 connection via Relay2 without using the existing KNRP ID since the KNRP ID state is set to "pending refresh".

At 608, End WTRU1 sends to End WTRU2 via Relay2 a DCR message and does not include the KNRP ID associated to the pair of End WTRU1/End WTRU2, even if the KNRP/KNRP ID exist. Generally, the DCR message may include other parameters, such as target user info, security policy info, etc.

At 609, End WTRU1 and End WTRU2 authenticate themselves other via Relay2. New KNRP/KNRP ID are derived. The existing KNRP ID is replaced with the new derived value and its state is set to "valid, meaning the KNRP/KNRP ID may be used for session key derivation and KNRP ID may be used for other PC5 connection establishment. Note, the example of FIG. 6, as illustrated at 609, concerns a scenario that requires a full authentication procedure. That is, a new key and new key ID.

At 610, End WTRU1 and End WTRU2 establish the security for the connection between End WTRUs via Relay2. The KNRP ID is used to locate the corresponding KRNP used to derive the session and security keys to secure the connection.

At 611, End WTRU1 receives from End WTRU2 a DCA completing the connection establishment.

Figure 7:
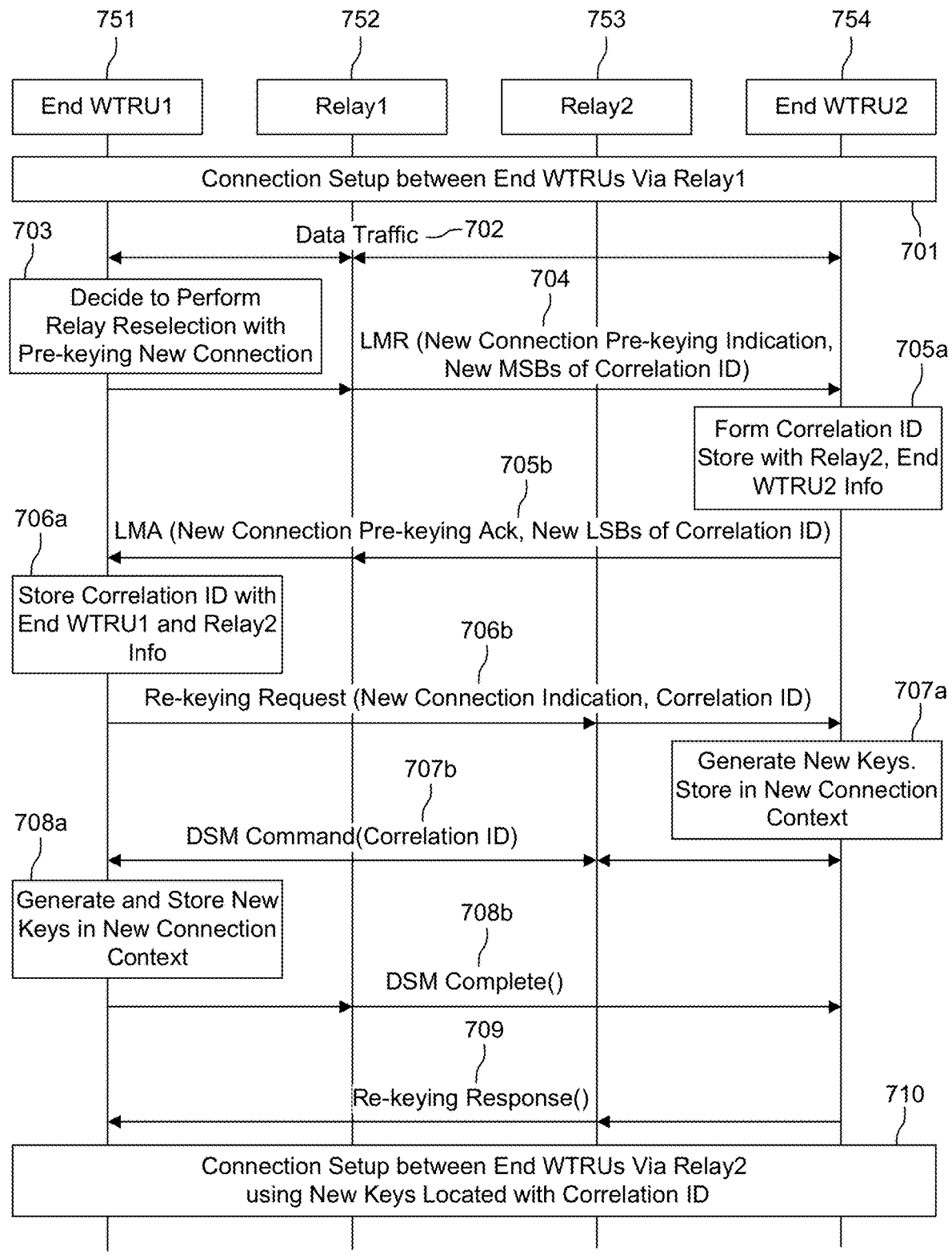
FIG. 7 illustrates an example of ProSe WTRU-to-WTRU Relay reselection security using enhanced pre-keying procedure.

FIG. 7 illustrates an example of ProSe U2U Relay reselection security with pre-keying of the new connection with second relay. As shown, there may be a number of devices involved in a reselection procedure, such as End WTRU1 751, a Relay1 752, Relay2 753, and/or End WTRU2 754. While FIG. 7 presents an ordered series of actions/events, it is intended that one or more of these actions/events may be optional, and/or one or more of these actions/events may occur/be performed in a different order than presented.

At 701, a connection for unicast communication between the End WTRUs is established via Relay1.

At 702, there may be one or more messages sent/received between the End WTRUs via the Relay1.

At 703, End WTRU1 decides to perform U2U Relay reselection with End WTRU2. End WTRU1 determines to perform reselection with pre-keying of a new connection via the current connection based on a current connection security policy/configuration, example signaling integrity is turned ON. End WTRU1 allocates one or more new MSBs of correlation ID.

At 704, End WTRU1 sends to End WTRU2 a Link Modification Request (LMR) message that includes the one or more new MSBs of correlation ID, new connection pre-keying indication, and/or other parameters such as reselection indication, identifiers of Relay candidates including Relay2.

At 705a, End WTRU2 allocates one or more new LSBs of correlation ID and combines the one or more new MSBs and the one or more new LSBs of correlation ID to form a new correlation ID and stores the correlation ID in a new connection context associated with Relay2, along with End WTRU1 info such as User Info ID, KNRP/KNRP ID and/or Relay2 info such as Relay User Info ID, L2 ID, for example. At 705b, End WTRU2 sends to End WTRU1 a Link Modification Accept (LMA) message that includes ack of new connection pre-keying, correlation ID, and/or other parameter(s) such as identifier of selected Relay2.

At 706a, End WTRU1 combines the one or more new MSBs and the one or more new LSBs to form a new correlation ID and stores the new correlation ID in a new connection context associated with Relay2, along with End WTRU2 info and/or Relay2 info. At 706b, End WTRU1 sends to End WTRU2, via Relay1, a Pre-keying request message or Re-keying request message including an indication for generating new keys for the new connection. End WTRU1 includes in the message the correlation ID and/or other re-key security parameter(s) such as security capabilities, nonce, MSBs of new KNRP-sess ID.

At 707a, End WTRU2 generates a new session (KNRP-sess) and security keys (NRPEK and NRPIK) and stores the keys in the new connection context. At 707b, End WTRU2 sends to End WTRU1 via Relay1 a DSM Command message including correlation ID and conventional re-key security parameters. The message is protected using the already established security context for current connection (e.g., no indication is sent to the lower layer to activate new security using new keys).

At 708, End WTRU1 receives from End WTRU2 the DSM Command message including correlation ID and conventional re-key security parameter(s). At 708a, End WTRU1 generates and stores the new security keys in the new connection context. At 708b, End WTRU1 sends to End WTRU2 via Relay1 a DSM Complete message.

At 709, End WTRU2 sends to End WTRU1 a Re-keying response message confirming End WTRU2 is ready to use new keys in a connection via Relay2.

At 710, End WTRU1 sends to End WTRU2 via Relay2 an integrity protected DCR message including the correlation ID. The message is protected using the new keys associated from the new connection context. The authentication and security establishment procedures may be skipped over the new connection. End WTRU2 locates the new connection security keys based on correlation ID. End WTRU2 activates a security context for the new connection using the new connection stored security keys. End WTRU2 sends a DCA to End WTRU1 fully protected using the security context. End WTRU1 activates a security context for the new connection using the new connection stored security keys located with correlation ID.

In one example, there may be an approach for (Root) Key NR ProSe (KNRP) privacy protection using Link Modification Request/Accept/Ack (LMR/LMA/LMAck) during L2 U2U relay reselection procedure. This procedure may establish a new KNRP ID during Link Modification procedure, where a peer WTRU accepts initial connection maintenance preference. End WTRU1 establishes of new KNRP ID with End WTRU2 during the U2U Relay reselection procedure via a first Relay and uses the new KNRP ID during connection setup via second Relay.

Initially in this example, the End WTRU1 may determine to establish a new KNRP ID for the new connection during reselection based on decision to maintain the current connection via first Relay, which may, for example, be based on ProSe service/RSC configuration, and/or current resource usage.

The End WTRU1 may send to the End WTRU2 via first Relay an LMR message including an indication for the maintenance of the initial connection, prior to setup of connection via second Relay, newly allocated one or more MSBs of KNRP ID to inform End WTRU2 to update current KNRP ID shared with End WTRU1.

The End WTRU1 may receive from the End WTRU2 a LMA message that includes one or more new LSBs of KNRP ID.

The End WTRU1 may combine the one or more new MSBs of KNRP ID and the one or more new LSBs of KNRP ID.

The End WTRU1 may store the new KNRP ID by replacing the current KNRP ID.

The End WTRU1 may send to the End WTRU2 via the second Relay a DCR message including the new KNRP ID.

The End WTRU1 may receive from End WTRU2 via the second Relay a DCA message.

The End WTRU1 may decide to initiate release of initial connection or to keep it.

In one example, there may be an approach that establishes a new KNRP ID during Link Modification procedure where a peer WTRU connection release is not accepted by the peer WTRU.

Initially in this example, the End WTRU1 determines to establish a new KNRP ID for the new connection during reselection based on decision to maintain current connection via first Relay, which may, for example, be based on ProSe service/RSC configuration, current resource usage.

The End WTRU1 may send to End WTRU2 via first Relay an LMR message including an indication for the preference release of the initial connection prior to setup of connection via second Relay.

The End WTRU1 may receive from End WTRU2 a LMA message that includes one or more new LSBs of KNRP ID.

The End WTRU1 may send to End WTRU2 via first Relay an LMAck that includes one or more new MSBs of KNRP ID.

The End WTRU1 combines the one or more new MSBs of KNRP ID and the one or more new LSBs of KNRP ID.

The End WTRU1 uses new KNRP ID during setup of new connection via the second Relay.

In one example, there may be an approach for KNRP ID privacy protection using coordination of initial connection Release during L2 U2U Relay Reselection procedure. A new KNRP ID may be established by coordinating Link Release of initial connection via first Relay using Link Modification procedure.

Initially in this example, the End WTRU1 may coordinate the release of current connection via first relay with End WTRU2 to establish new KNRP ID prior to using it in the setup of new connection via second relay.

The End WTRU1 may determine to coordinate the release of current connection and establish a new KNRP ID for the new connection, which may, for example be based on ProSe service/RSC configuration, current resource usage.

The End WTRU1 may send to End WTRU2 via the first Relay an LMR message including an indication for the release of the initial connection prior to setup of new connection via second Relay.

The End WTRU1 may receive from End WTRU2 an LMA message including an acknowledgement for the release of the initial link. Note, the LMR/LMA negotiate the release, but not actually trigger the release.

The End WTRU1 may send to End WTRU2 via the first Relay a Link Release request including an allocated one or more new MSBs of KNRP ID. Note, the Link Release request actually triggers the release of the connection.

The End WTRU1 may receive from End WTRU2 a Link Release response including one or more new LSBs of KNRP ID.

The End WTRU1 may combine the one or more new MSBs of KNRP ID and the one or more new LSBs of KNRP ID and stores the new KNRP ID by replacing the current KNRP ID.

End WTRU1 sends to End WTRU2 via the second Relay a DCR message including the new KNRP ID upon receiving a Link Release response message from End WTRU2.

In one example, there may be an approach for pre-keying of new connection procedures during a L2 U2U Relay Reselection procedure. New security keys may be generated during a relay reselection procedure over an initial connection via a first relay. The new keys may be used for the security of the new connection via second Relay.

Initially in this example, the End WTRU1 may negotiate performing a pre-keying of security keys to be used to secure a connection via a second relay during the U2U Relay reselection procedure via a first Relay.

The End WTRU1 may determine, based on Security Policy/configuration for initial connection via first Relay (e.g., non-NULL integrity algorithm is in use), to perform an enhanced re-keying as part of U2U Relay reselection procedure.

The End WTRU1 may send to End WTRU2 via first Relay an LMR message including an indication for performing an enhanced re-keying to generate fresh session keys prior to setup of new connection via second Relay and one or more new MSBs of an allocated correlation ID, list of relay identifiers.

The End WTRU1 may receive from End WTRU2 a LMA message including an acknowledgment for performing enhanced re-keying, identifier for the selected second relay, one or more new LSBs of a new correlation ID. End WTRU1 combines the one or more new MSBs and the one or more new LSBs of correlation ID to form a correlation ID used to associate initial connection and new connection to be established.

The End WTRU1 may send to End WTRU2 via first Relay a Re-keying request message including an indication for generating new keys for the new connection, identifier(s) associated with the second relay (e.g., any of User Info ID, L2 ID, correlation ID) and other re-key security parameters such as security capabilities, nonce, MSB of new KNRP-sess ID.

The End WTRU1 may receive from End WTRU2 a DSM Command message including correlation ID and conventional re-key security parameters.

The End WTRU1 may generate a new session key with identifier (KNRP-sess and ID) and new security keys (NRPEK and NRPIK) to be used with the new connection.

The End WTRU1 may store along with the existing KNRP ID, the new keys for the new connection and identifier(s) associated with the second relay.

The End WTRU1 may send to End WTRU2 via first Relay a DSM Complete message.

The End WTRU1 may receive from End WTRU2 a Re-keying response message confirming End WTRU2 ready to use new keys in a connection via second relay. End WTRU1 and End WTRU2 preserve the security context for the initial connection via Relay1.

The End WTRU1 may transmit the correlation ID in an integrity protected DCR message for End WTRU2 to locate the new security keys and establish the new connection security using those keys.

Figure 8:
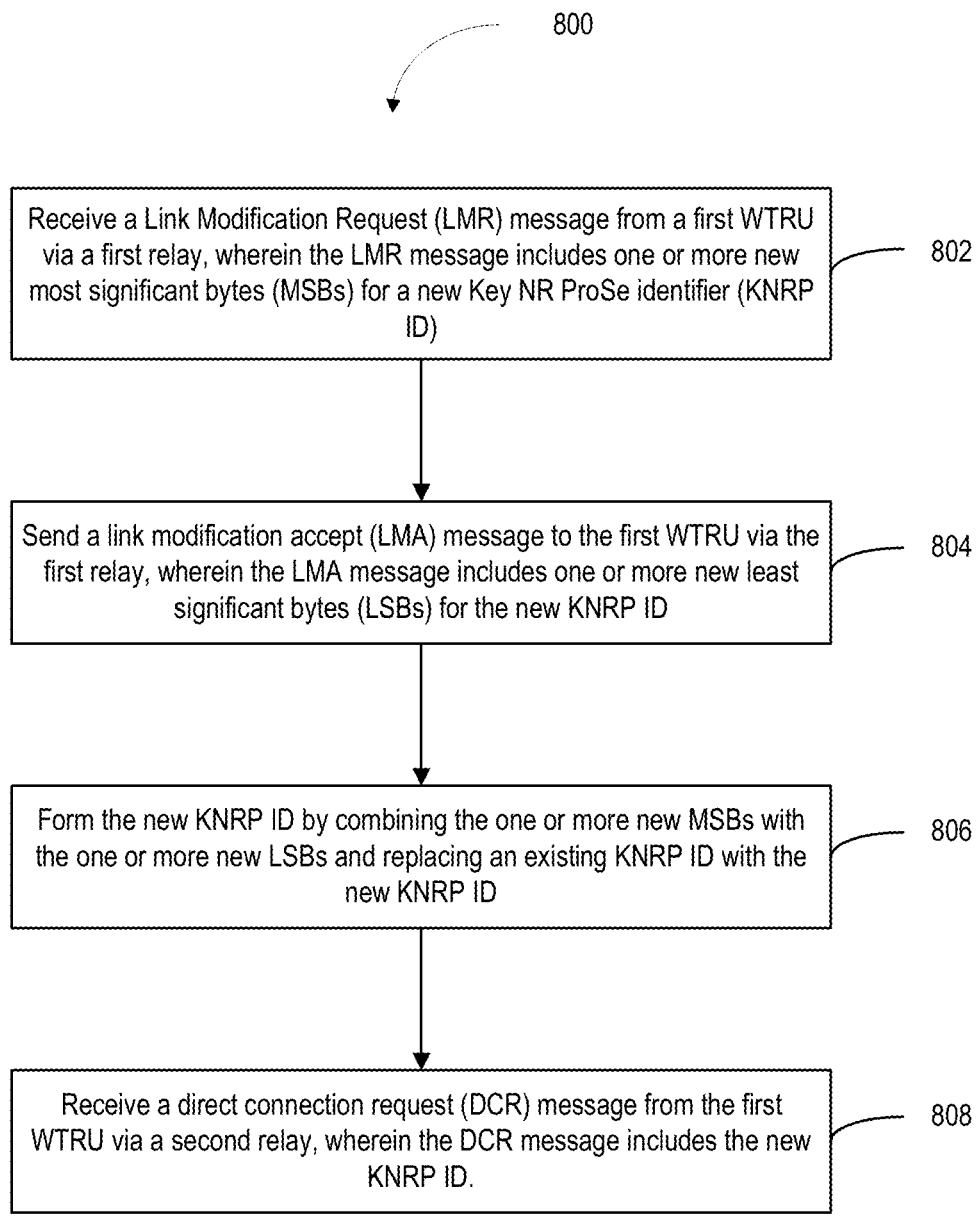
FIG. 8 illustrates an example link modification process.

FIG. 8 illustrates a link modification process. As shown in FIG. 8, process 800 may include receiving a Link Modification Request (LMR) message from a first WTRU via a first relay, where the LMR message includes one or more new most significant bytes (MSBs) for a new Key NR ProSe identifier (KNRP ID) at 802. For example, a WTRU may receive a LMR message from a first WTRU via a first relay, where the LMR message includes one or more new MSBs for a new KNRP ID, as described above. As also shown in FIG. 8, process 800 may include sending a link modification accept (LMA) message to the first WTRU via the first relay, where the LMA message includes one or more new least significant bytes (LSBs) for the new KNRP ID at 804. For example, The WTRU may send a LMA message to the first WTRU via the first relay, where the LMA message includes one or more new least LSBs for the new KNRP ID, as described above. As further shown in FIG. 8, process 800 may include forming the new KNRP ID by combining the one or more new MSBs with the one or more new LSBs and replacing an existing KNRP ID with the new KNRP ID at 806. For example, the WTRU may form the new KNRP ID by combining the one or more new MSBs with the one or more new LSBs and replacing an existing KNRP ID with the new KNRP ID, as described above. As also shown in FIG. 8, process 800 may include receiving a direct connection request (DCR) message from the first WTRU via a second relay, where the DCR message includes the new KNRP ID at 808. For example, the WTRU may receive a DCR message from the second WTRU via a second relay, where the DCR message includes the new KNRP ID, as described above.

Process 800 may include additional implementations, such as any single implementation or any combination of implementations described below and/or in connection with one or more other processes described elsewhere herein. A first implementation, process 800 may include receiving a message from the first WTRU via the first relay over a first connection, prior to receiving the LMR message, where the first connection is established based on the existing KNRP ID, where the existing KNRP ID is different than the new KNRP ID.

In a second implementation, alone or in combination with the first implementation, the existing KNRP ID is the same at the first WTRU and the second WTRU. In a third implementation, alone or in combination with the first and second implementation, the existing KNRP ID is discarded once the new KNRP ID is formed.

In a fourth implementation, alone or in combination with one or more of the first through third implementations, process 800 may include determining to maintain an initial connection of the first relay based on a configuration parameter that controls usage of simultaneous connections, where the configuration parameter includes a maximum number of simultaneous connections allowed for a ProSe service.

Although FIG. 8 illustrates example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As described herein, a higher layer may refer to one or more layers in a protocol stack, or a specific sublayer within the protocol stack. The protocol stack may comprise of one or more layers in a WTRU or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non-Access Stratum (NAS), Access Stratum (AS) Internet Protocol (IP), and/or Radio Resource Control (RRC). For example, Layer 2 may comprise of one or more of the following: Service Data Adaption Protocol (SDAP), Packet Data Convergence Control (PDCP), Radio Link Control (RLC), and/or Medium Access Control (MAC). For example, Layer 1 may comprise of physical (PHY) layer operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations (e.g., embodiments, methods, examples, etc.), one of ordinary skill in the art will appreciate that each feature or element can be used alone or in any combination with the other features and elements. For example, as disclosed herein there may be a method described in association with a figure for illustrative purposes, and one of ordinary skill in the art will appreciate that one or more features or elements from this method may be used alone or in combination with one or more features from another method described elsewhere. A symbol '/' (e.g., forward slash) may be used herein to represent 'and/or', where for example, 'A/B' may imply 'A and/or B'. As used herein, 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example' or indicate that something "does happen" or "can happen". In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a second wireless transmit receive unit (WTRU), the method comprising:
   receiving a Link Modification Request (LMR) message from a first WTRU via a first relay, wherein the LMR message includes one or more new most significant bytes (MSB) s for a new Key NR ProSe identifier (KNRP ID);
   sending a link modification accept (LMA) message to the first WTRU via the first relay, wherein the LMA message includes one or more new least significant bytes (LSBs) for the new KNRP ID, wherein the second WTRU is configured to not exceed a maximum number of simultaneous ProSe connections;
   forming the new KNRP ID by combining the one or more new MSBs with the one or more new LSBs and replacing an existing KNRP ID with the new KNRP ID; and
   receiving a direct connection request (DCR) message from the first WTRU via a second relay, wherein the DCR message includes the new KNRP ID.

2. The method of claim 1, further comprising receiving a message from the first WTRU via the first relay over a first connection prior to receiving the LMR message, wherein the first connection is established based on the existing KNRP ID, and wherein the existing KNRP ID is different from the new KNRP ID.

3. The method of claim 1, wherein the existing KNRP ID is the same at the first WTRU and the second WTRU.

4. The method of claim 1, wherein the existing KNRP ID is discarded once the new KNRP ID is formed.

5. The method of claim 1, further comprising determining to maintain an initial connection of the first relay based on a configuration parameter that controls usage of simultaneous connections.

6. A second wireless transmit receive unit (WTRU) comprising:
   a processor; and
   a transceiver, the processor and the transceiver configured to:
      receive a Link Modification Request (LMR) message from a first WTRU via a first relay, wherein the LMR message includes one or more new most significant bytes (MSBs) for a new Key NR ProSe identifier (KNRP ID) of a current key;
      send a link modification accept (LMA) message to the first WTRU via the first relay, wherein the LMA message includes one or more new least significant bytes (LSBs) for the new KNRP ID, wherein the second WTRU is configured to not exceed a maximum number of simultaneous ProSe connections;
      form the new KNRP ID by combining the one or more new MSBs with the one or more new LSBs and replacing an existing KNRP ID with the new KNRP ID; and
      receive a direct connection request (DCR) message from the first WTRU via a second relay, wherein the DCR message includes the new KNRP ID.

7. The WTRU of claim 6, wherein the processor and the transceiver are configured to receive a message from the first WTRU via the first relay over a first connection prior to receiving the LMR message, and wherein the first connection is established based on the existing KNRP ID, wherein the existing KNRP ID is different from the new KNRP ID.

8. The WTRU of claim 6, wherein the existing KNRP ID is the same at the first WTRU and the second WTRU.

9. The WTRU of claim 6, wherein the existing KNRP ID is discarded once the new KNRP ID is formed.

10. The WTRU of claim 6, wherein the processor and the transceiver are configured to maintain an initial connection of the first relay based on a configuration parameter that controls usage of simultaneous connections.

* * * * *